US011908597B2

(12) United States Patent
Shirai

(10) Patent No.: US 11,908,597 B2
(45) Date of Patent: Feb. 20, 2024

(54) FLAT ELECTRIC WIRE AND METHOD FOR MANUFACTURING FLAT ELECTRIC WIRE

(71) Applicant: Yazaki Corporation, Tokyo (JP)

(72) Inventor: Mizuki Shirai, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/963,329

(22) Filed: Oct. 11, 2022

(65) Prior Publication Data

US 2023/0116494 A1 Apr. 13, 2023

(30) Foreign Application Priority Data

Oct. 13, 2021 (JP) ................................ 2021-168197

(51) Int. Cl.
*H01B 7/08* (2006.01)
*H01B 13/00* (2006.01)
*H01B 13/06* (2006.01)

(52) U.S. Cl.
CPC ....... *H01B 7/0823* (2013.01); *H01B 13/0016* (2013.01); *H01B 13/06* (2013.01)

(58) Field of Classification Search
None
See application file for complete search history.

(56) References Cited

U.S. PATENT DOCUMENTS 3,391,246 A * 7/1968 Freeman .................. H05K 3/20 174/117 FF
3,663,739 A * 5/1972 Chevrier .................. H01B 7/08 174/32
4,138,193 A * 2/1979 Olszewski ........... G02B 6/4403 174/117 F
5,084,594 A * 1/1992 Cady .................... H01B 7/0861 174/117 M
6,444,910 B1 * 9/2002 Goto ........................ H01R 4/70 174/70 B
7,154,044 B2 * 12/2006 Horikoshi ................ C25D 5/50 174/117 FF
8,138,421 B2 * 3/2012 Takamatsu ............... H01B 3/56 174/117 FF
2012/0255761 A1 * 10/2012 Shanai ................... C09J 177/08 428/355 R
2013/0233590 A1 * 9/2013 Shanai ................... H01B 7/295 428/335
2022/0270783 A1 * 8/2022 Kojima ................ H01B 7/0861

FOREIGN PATENT DOCUMENTS

EP 1061606 A2 * 12/2000 ............ H01R 12/63
JP 2011-14447 A 1/2011

* cited by examiner

*Primary Examiner* — Krystal Robinson
(74) *Attorney, Agent, or Firm* — Sughrue Mion, PLLC

(57) ABSTRACT

The present disclosure relates to a flat electric wire and a method for manufacturing a flat electric wire. The flat electric wire includes a plurality of conductors arranged in parallel in a width direction and having substantially a same cross-sectional area with each other, resin films provided on one side and the other side of the plurality of conductors in a thickness direction orthogonal to the width direction, and an insulator covering the plurality of conductors together with the resin films. Each of the resin films have a Young's modulus of 2 GPa or more and a film thickness of 200 μm or more.

5 Claims, 5 Drawing Sheets

FLAT ELECTRIC WIRE AND METHOD FOR MANUFACTURING FLAT ELECTRIC WIRE

CROSS-REFERENCE TO RELATED APPLICATIONS

This application is based on and claims priority under 35 USC 119 from Japanese Patent Application No. 2021-168197 filed on Oct. 13, 2021, the contents of which are incorporated herein by reference.

TECHNICAL FIELD

The present disclosure relates to a flat electric wire and a method for manufacturing a flat electric wire.

BACKGROUND ART

In the related art, there has been a flat electric wire in which a plurality of conductors are arranged in parallel and covered with an insulator. In such a flat electric wire, when edgewise bending is performed at the time of wiring to a vehicle or the like, a force is applied from a side of the flat electric wire, and the conductors aligned along a width direction tend to be shifted in a thickness direction of the flat electric wire (hereinafter, this is called conductor parallel collapse).

Therefore, a flat electric wire that suppresses conductor parallel collapse at the time of edgewise bending or the like has been proposed, for example, in JP2011-014447A. In the flat electric wire, a plurality of conductors are formed of stranded wires having different sizes to increase biting of an insulator into a conductor side and to suppress the conductor parallel collapse.

However, in the flat electric wire described in JP2011-014447A, since the sizes of the plurality of conductors are different from each other, a thickness and a width tend to be greater than those in a case where conductors having the same size are arranged in parallel. Further, since the sizes of the conductors are different from each other, a stripping property of a terminal may deteriorate.

SUMMARY OF INVENTION

The present disclosure provides a flat electric wire and a method for manufacturing a flat electric wire capable of preventing deterioration of a stripping property and an increase in size due to difference conductor sizes, and capable of suppressing conductor parallel collapse.

According to the present disclosure, a flat electric wire includes a plurality of conductors arranged in parallel in a width direction and having substantially a same cross-sectional area with each other, resin films provided on one side and the other side of the plurality of conductors in a thickness direction orthogonal to the width direction, and an insulator covering the plurality of conductors together with the resin films. Each of the resin films have a Young's modulus of 2 GPa or more and a film thickness of 200 μm or more.

According to the present disclosure, a flat electric wire includes a plurality of conductors arranged in parallel in a width direction and having substantially a same cross-sectional area to each other, and an insulator covering the plurality of conductors. A method for manufacturing the flat electric wire includes arranging resin films on one side and the other side of the plurality of conductors in a thickness direction orthogonal to the width direction, and forming the insulator by thermally shrinking an insulating heat shrinkable tube disposed around the plurality of conductors on which the resin films are arranged, or by extrusion coating an insulating resin softened by heating. The resin films each having a Young's modulus of 2 GPa or more and a film thickness of 200 μm or more.

The present disclosure has been briefly described above. Details of the present disclosure will be further clarified by reading a mode for carrying out the disclosure to be described below (hereinafter, referred to as "embodiment") with reference to the accompanying drawings.

DESCRIPTION OF EMBODIMENTS

Hereinafter, the present disclosure will be described in accordance with an embodiment. The present disclosure is not limited to the embodiment to be described below, and can be changed as appropriate without departing from the spirit of the present disclosure. Further, although some configurations are not shown or described in the embodiment to be described below, it goes without saying that a known or well-known technique is applied as appropriate to details of an omitted technique within a range in which no contradiction occurs to contents to be described below.

Figure 1:
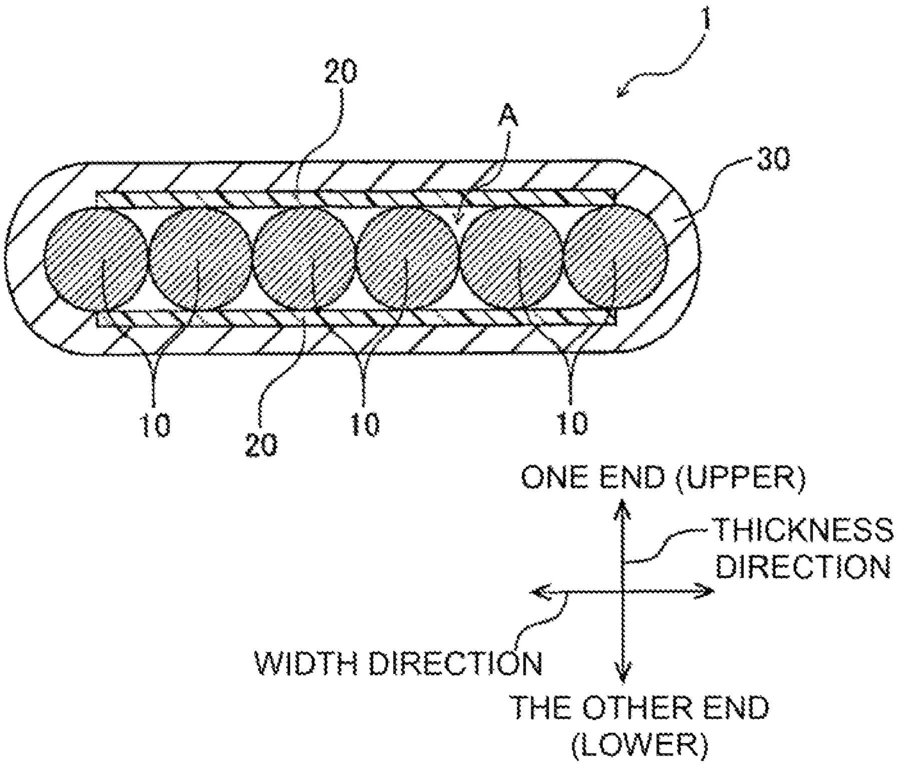
FIG. 1 is a cross-sectional view showing a flat electric wire according to an embodiment of the present disclosure.

FIG. 1 is a cross-sectional view showing a flat electric wire according to an embodiment of the present disclosure. As shown in FIG. 1, the flat electric wire 1 according to the present embodiment includes a plurality of conductors 10, resin films 20, and an insulator 30.

The plurality of conductors 10 are elongated conductive linear bodies for transmitting power, signals, and the like, and are made of, for example, a metal such as copper or aluminum, an alloy of these metals, or a product obtained by metal plating these metals. The plurality of conductors 10 are single wires in the example shown in FIG. 1, but the present disclosure is not limited thereto, and the plurality of conductors 10 may be stranded wires formed by twisting a plurality of element wires. The plurality of conductors 10 have substantially the same cross-sectional area (the same conductor size), and are arranged in parallel with each other.

When a direction orthogonal to a width direction in which the plurality of conductors 10 are arranged in parallel in a cross section, cross section orthogonal to a longitudinal direction of the flat electric wire 1, shown in FIG. 1 is defined as a thickness direction, the resin films 20 are stacked on one side and the other side of the plurality of conductors 10 in the thickness direction, respectively. The resin film 20 is made of an insulating resin, for example, polyethylene terephthalate.

The insulator 30 covers the plurality of conductors 10 together with the resin films 20, and is made of, for example, polypropylene (PP), polyethylene (PE), and poly vinyl chloride (PVC). The insulator 30 may be formed by thermally shrinking a heat-shrinkable tube disposed around the plurality of conductors 10, or may be formed by extrusion coating.

As shown in FIG. 1, a region surrounded by the adjacent conductors 10 and the resin film 20 (for example, a region indicated by a reference character A) is not filled with the insulator 30 and is a gap.

Here, in a general flat electric wire, when edgewise bending is performed at the time of wiring to a vehicle or the like, a force is applied from an outer side toward an inner side in the width direction, and conductor parallel collapse in which conductors are shifted in the thickness direction may occur.

However, in the flat electric wire 1 according to the present embodiment, the resin films 20 are stacked on upper and lower sides of the plurality of conductors 10. Therefore, even if the conductor 10 is about to be shifted up and down, this tendency can be suppressed.

In particular, the resin film 20 according to the present embodiment has a Young's modulus of 2 GPa or more and a film thickness of 200 μm or less. Since the Young's modulus is 2 GPa or more, the resin film 20 has a certain hardness or more, and an effect of suppressing the conductor parallel collapse can be suitably exhibited. Further, since the film thickness is 200 μm or more, the resin film 20 has a certain thickness, and the effect of suppressing the conductor parallel collapse can be suitably exhibited.

Further, the resin film 20 according to the present embodiment preferably has the Young's modulus of 5 GPa or less and the film thickness of 300 μm or less. If the Young's modulus exceeds 5 GPa or the film thickness exceeds 300 μm, the resin film 20 may become unnecessarily hard, and flexibility of the flat electric wire 1 may be impaired more than necessary due to the presence of the resin film 20.

In addition, a length of the resin film 20 in the width direction according to the present embodiment is preferably equal to or greater than an outer diameter of one conductor 10×(the number of the plurality of conductors−1). That is, in the example shown in FIG. 1, since the number of the plurality of conductors 10 is six, the length of the resin film 20 in the width direction is preferably equal to or greater than the outer diameter of one conductor 10×5. This is because if the length of the resin film 20 is less than the outer diameter of one conductor 10×(the number of conductors−1), the suppression of the conductor parallel collapse becomes insufficient.

Further, the length of the resin film 20 in the width direction according to the present embodiment is preferably equal to or less than the outer diameter of one conductor 10×the number of the plurality of conductors. That is, since the number of the plurality of conductors 10 is six in the example shown in FIG. 1, the length of the resin film 20 in the width direction is preferably equal to or less than the outer diameter of one conductor 10×6. This is because if the length of the resin film 20 exceeds the outer diameter of one conductor 10×the number of the plurality of conductors, an unintended gap is formed, and the conductors 10 on both end sides move outward or an electric wire width increases.

Further, an adhesive or a pressure-sensitive adhesive may be provided on at least one of a front surface and a back surface of the resin film 20. Accordingly, this is because the resin film 20 can be fixed to at least one of the plurality of conductors 10 and the insulator 30. That is, it is possible to prevent insufficient suppression of the conductor parallel collapse in a case where, for example, the resin films 20 are shifted in the width direction and do not present on the upper and lower sides of a part of the conductors 10. In particular, the adhesive or the pressure-sensitive adhesive is preferably provided on a surface of the resin film 20 on an insulator 30 side. This is because when the adhesive or the pressure-sensitive adhesive is provided on a surface of the resin film 20 on a side of the conductors 10, stripping property may be deteriorated.

Next, details of an operation of the flat electric wire 1 according to the present embodiment will be described with reference to FIGS. 2 to 5. FIGS. 2 to 5 are cross-sectional views showing the details of the operation of the flat electric wire according to the embodiment of the present disclosure.

Figure 2:
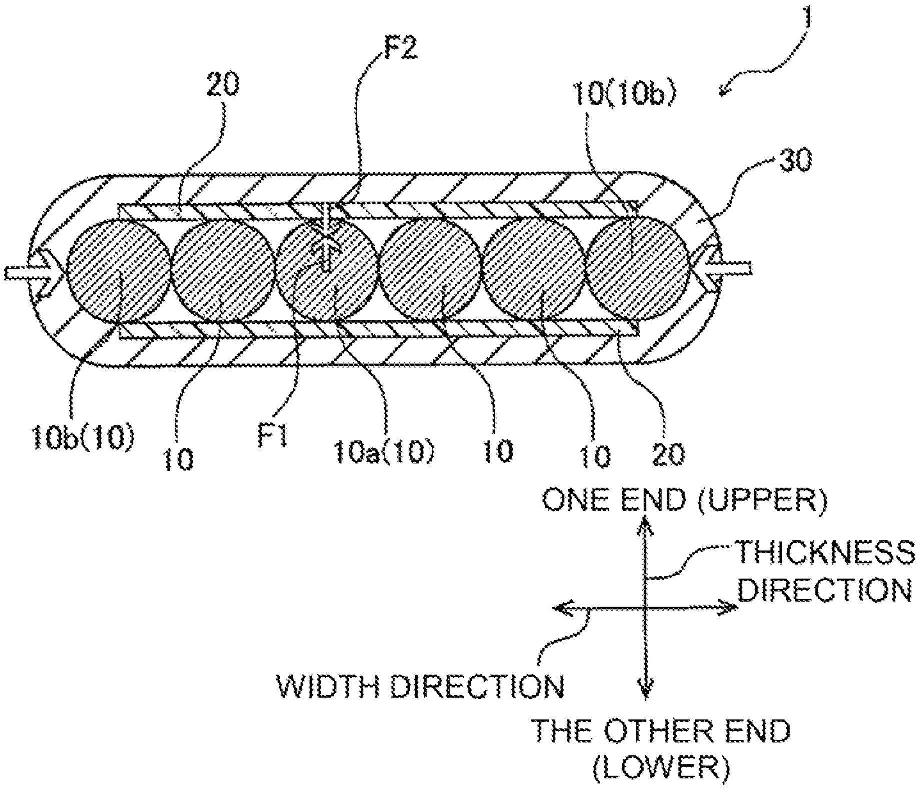
FIG. 2 is a first cross-sectional view showing details of an operation of the flat electric wire according to the embodiment of the present disclosure.

First, it is assumed that the flat electric wire 1 is edgewise bent, for example, during wiring to a vehicle. In this case, as shown in FIG. 2, forces are applied to the plurality of conductors 10 from the outer side toward the inner side in the width direction. Then, for example, it is assumed that a force F1 that leads to shift in the thickness direction is applied to the specific conductor 10*a* due to the forces applied toward the inner side. However, since the flat electric wire 1 according to the present embodiment includes the resin films 20 on the respective upper and lower sides in the thickness direction, a force F2 that is opposite to the force F1 by which the specific conductor 10*a* is shifted in the thickness direction can be generated, and the conductor parallel collapse can be suppressed.

In the case where the adhesive or the pressure-sensitive adhesive is provided on the surface of the resin film 20 on the insulator 30 side, as shown in FIG. 2, when the forces are applied from the outer side toward the inner side in the width direction, the resin film 20 moves in the thickness direction (upper-lower direction) together with the insulator 30, and the conductor parallel collapse may not be suppressed. However, the resin film 20 (having the Young's modulus of 2 GPa or more and the film thickness of 200 μm or more) according to the present embodiment has an appropriate Young's modulus and film thickness, and can prevent such movement as long as the forces are applied from the outer side toward the inner side in the width direction.

Figure 3:
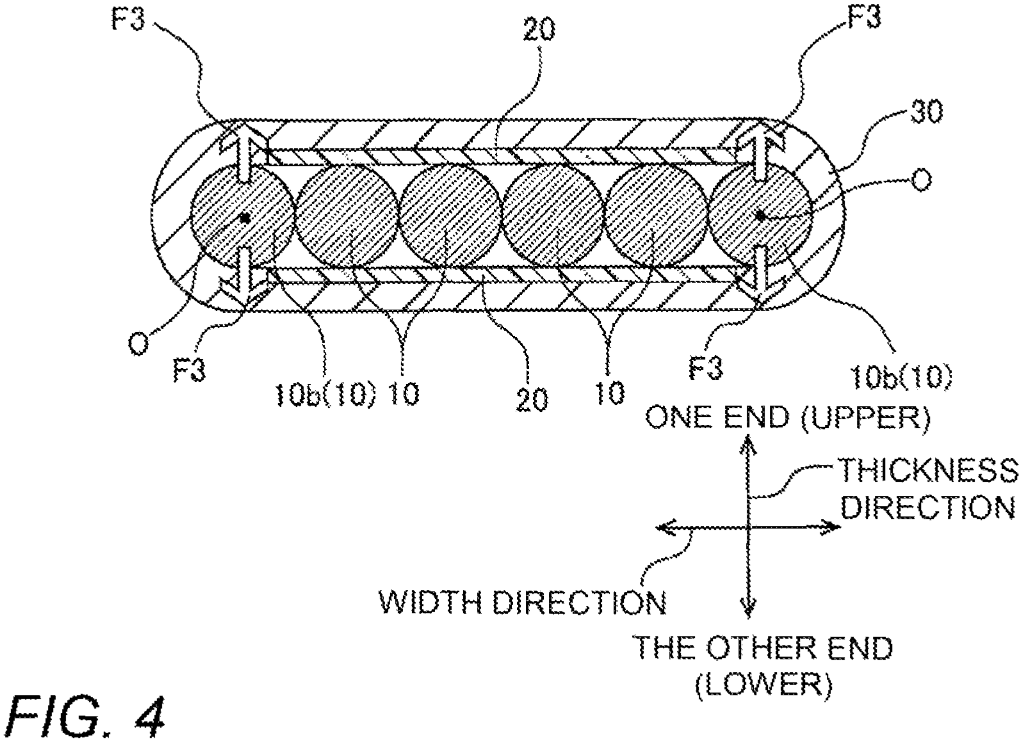
FIG. 3 is a second cross-sectional view showing details of the operation of the flat electric wire according to the embodiment of the present disclosure.

Further, as shown in FIGS. 1 and 2, when the length of the resin film 20 in the width direction is equal to or greater than the outer diameter of one conductor 10×(the number of the plurality of conductors−1), the shift of the conductors 10*b* on both end sides can be suppressed. That is, as shown in FIG. 3, when the length of the resin film 20 in the width direction is less than the outer diameter of one conductor 10×(the number of the plurality of conductors−1), the resin films 20 do not present above and below center positions O of the conductors 10*b* on both end sides. Therefore, for example, when the forces are applied from the outer side toward the inner side in the width direction, it is difficult to generate a force that is opposite to a force F3 by which the conductors 10*b* on both end sides are shifted in the thickness direction, and it is difficult to suppress the shift of the conductors 10*b* on both end sides. However, when the length of the resin film 20 in the width direction is equal to or greater than the outer diameter of one conductor 10×(the number of the plurality of conductors−1), it is possible to generate the force that is opposite to the force F3 and for shifting the conductors 10*b* on both end sides in the thickness direction, and the shift of the conductors 10*b* on both end sides can be suppressed.

Figure 4:
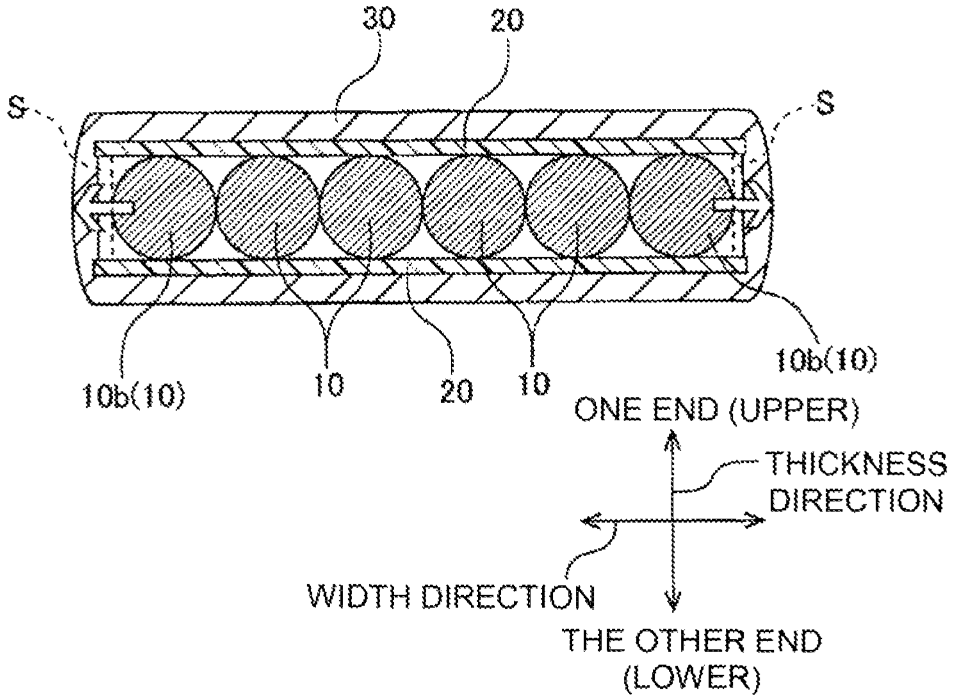
FIG. 4 is a third cross-sectional view showing details of the operation of the flat electric wire according to the embodiment of the present disclosure.

Further, as shown in FIGS. 1 and 2, when the length of the resin film 20 in the width direction is equal to or less than the outer diameter of one conductor 10×the number of the plurality of conductors, it is possible to prevent an unintended gap from being formed and prevent the conductors 10*b* on both end sides from moving outward or the electric wire width from increasing. That is, as shown in FIG. 4, when the length of the resin film 20 in the width direction exceeds the outer diameter of one conductor 10×the number of the plurality of conductors, gaps S not filled with the insulator 30 are easily formed on the outer sides in the width direction of the conductors 10*b* on both end sides. Accordingly, the conductors 10*b* on both end sides are easily moved outward in the width direction, and the conductors 10 are shifted. Further, since the resin film 20 is long in the width direction, the electric wire width of the flat electric wire 1 is increased. However, in the case where the length of the resin film 20 in the width direction is equal to or less than the outer diameter of one conductor 10×the number of the plurality of conductors, it is possible to prevent the conductors 10 on both end sides from moving outward or the electric wire width from being increased.

Figure 5:
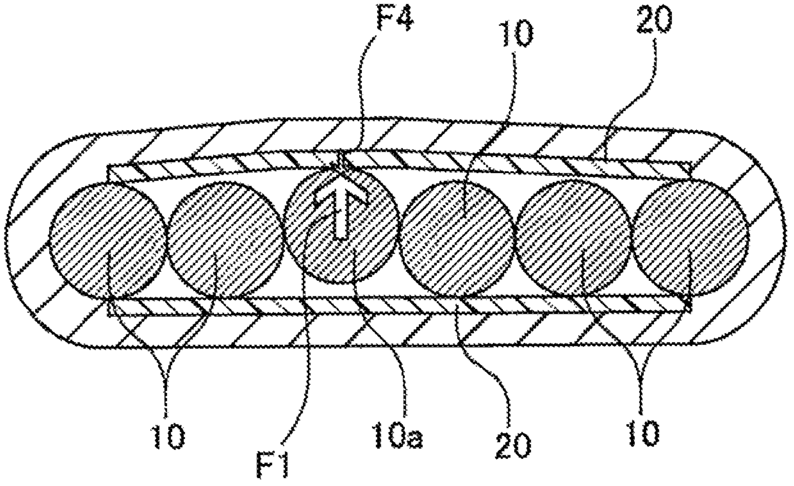
FIG. 5 is a fourth cross-sectional view showing details of the operation of the flat electric wire according to the embodiment of the present disclosure.
Figure 5:
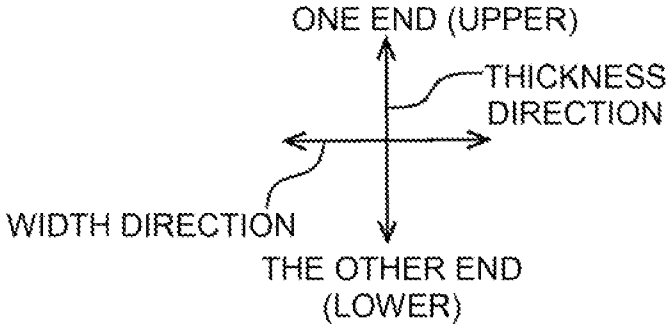

In addition, when the Young's modulus of the resin film 20 is 2 GPa or more and the film thickness is 200 μm or more, the effect of suppressing the conductor parallel collapse can be more suitably exhibited. Here, when the Young's modulus is less than 2 GPa or the film thickness is less than 200 μm the resin film 20 becomes too soft. As a result, as shown in FIG. 5, in a case where the force F1 for shifting the specific conductor 10*a* in the thickness direction is generated, an opposing force F4 generated by the resin film 20 becomes small, and the effect of suppressing the conductor parallel collapse may not suitably exhibited. However, when the Young's modulus of the resin film 20 is 2 GPa or more and the film thickness is 200 μm or more, the effect of suppressing the conductor parallel collapse can be more suitably exhibited.

Further, in the present embodiment, when the Young's modulus of the resin film 20 is 5 GPa or less and the film thickness is 300 μm or less, the resin film 20 does not become too hard or too thick. Therefore, it is possible to reduce the possibility that the flexibility of the flat electric wire 1 is impaired more than necessary due to the presence of the resin film 20.

Further, in the present embodiment, when the adhesive or the pressure-sensitive adhesive is provided on at least one of the front surface and the back surface of the resin film 20, the resin film 20 and at least one of the plurality of conductors 10 and the insulator 30 can be fixed to each other. Therefore, it is possible to prevent the insufficient suppression of the conductor parallel collapse in the case where, for example, the resin films 20 are shifted in the width direction and do not present on the upper and lower sides of a part of the conductors 10.

Figure 6:
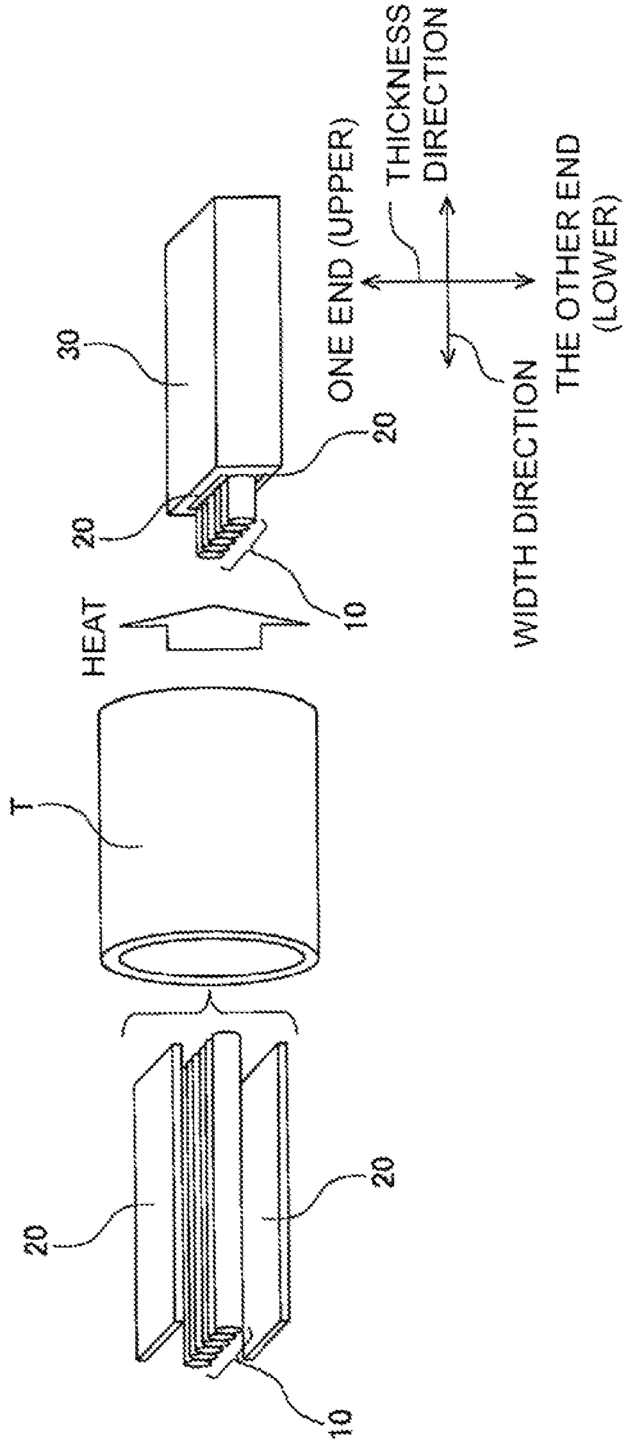
FIG. 6 is a step diagram illustrating a first method for manufacturing the flat electric wire according to the embodiment of the present disclosure.

Next, a method for manufacturing the flat electric wire 1 according to the present embodiment will be described. FIG. 6 is a step diagram showing a first method for manufacturing the flat electric wire 1 according to the present embodiment.

As shown in FIG. 6, first, the plurality of conductors 10 having substantially the same cross-sectional area are arranged in parallel. Next, the resin films 20 are stacked on one side and the other side of the plurality of conductors 10 in the thickness direction, respectively (first step). Here, if the adhesive or the pressure-sensitive adhesive is formed on the surface of the resin film 20 on a side of the plurality of conductors 10, a position of the stacked resin films 20 is stabilized, and the adhesive or the pressure-sensitive adhesive also plays a role of binding the conductors 10 arranged in parallel with each other.

Thereafter, the plurality of conductors 10 on which the resin films 20 are stacked are inserted from end portions of the plurality of conductors 10 into a heat shrinkable tube T. Thereafter, the heat shrinkable tube T is heated and shrunk to form the insulator 30 (second step). At this time, the resin films 20 are slightly melted, and a part of the resin films 20 enter the gap (region A or the like) shown in FIG. 1. Accordingly, the plurality of conductors 10 are formed in way of being held by the resin films 20 to a larger extent, and the effect of suppressing the conductor parallel collapse is further enhanced.

Figure 7:
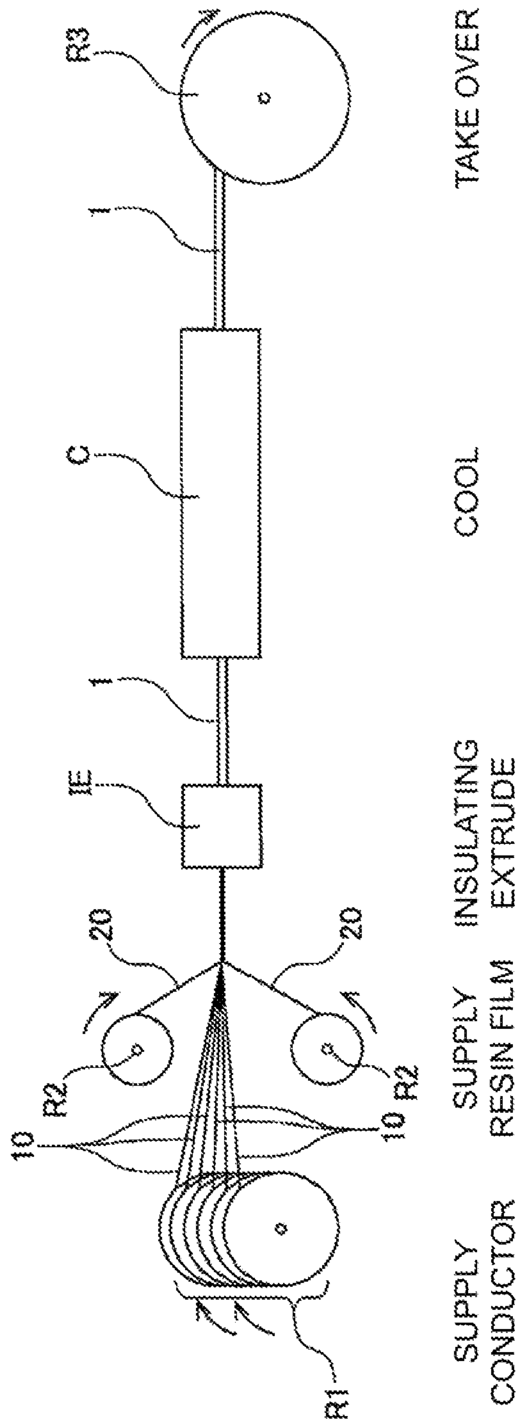
FIG. 7 is a step diagram illustrating a second method for manufacturing the flat electric wire according to the embodiment of the present disclosure.

FIG. 7 is a step diagram illustrating a second method for manufacturing the flat electric wire 1 according to the present embodiment. As shown in FIG. 7, first, it is assumed that the conductors 10 having the same cross-sectional area are wound around a plurality of first reels R1 respectively, and the same resin film 20 is wound around each of the two second reels R2.

Each of the plurality of first reels R1 supplies the conductor 10 by rotating. The plurality of conductors 10 are arranged in parallel by this supply. Next, each of the second reels R2 supplies the resin film 20 by rotating. Here, the supplied resin films 20 are stacked on one side and the other side of the plurality of conductors 10 arranged in parallel in the thickness direction (first step), If the adhesive or the pressure-sensitive adhesive is formed on the surface of the resin film 20 on the side of the plurality of conductors 10, the position of the stacked resin films 20 is stabilized, and the adhesive or the pressure-sensitive adhesive also plays the role of binding the conductors 10 arranged in parallel with each other.

Thereafter, the plurality of conductors 10 on which the resin films 20 are stacked are supplied to an insulating extruder IE. The insulating extruder IE extrusion coats an insulating resin softened by heating to form the insulator 30 around the plurality of conductors 10 on which the resin films 20 are stacked (second step). The resin films 20 are slightly melted by the heat from the insulating resin heated and softened in this step, and a part of the resin films 20 enter the gap (region A or the like) shown in FIG. 1.

Next, the flat electric wire 1 in which the insulator 30 is in a heated state is supplied to a cooler C and cooled. Thereafter, the cooled flat electric wire 1 is taken over by a third reel R3.

In this manner, according to the flat electric wire 1 of the present embodiment, since the plurality of conductors 10 have substantially the same cross-sectional area, it is possible to prevent deterioration of a stripping property and an increase in size due to different conductor sizes. Further, the resin films 20 are provided so as to be stacked on one side and the other side of the plurality of conductors 10 in the thickness direction. Therefore, when edgewise bending is performed, even if a force is applied from the outer side to the inner side in the width direction and the conductor 10 is about to be shifted in the thickness direction, the resin film 20 suppresses the shift. In particular, since the Young's modulus of the resin film 20 is 2 GPa or more, the plurality of conductors 10 can appropriately counteract the shift at a stage where the conductor parallel collapse occurs. Further, since the film thickness of the resin film 20 is 200 μm or more, it is possible to prevent a situation in which the resin film 20 is too thin to counteract the conductor parallel collapse. Therefore, it is possible to suppress the conductor parallel collapse while preventing the deterioration of the stripping property and the increase in size due to the different conductor sizes.

Further, since the Young's modulus of the resin film 20 is 5 GPa or less and the film thickness is 300 μm or less, it is possible to prevent a situation in which the flexibility of the electric wire is impaired more than necessary due to the presence of the resin film 20.

The length of the resin film 20 in the width direction is not less than the outer diameter of one conductor×(the number of the plurality of conductors−1) and not greater than the outer diameter of one conductor×the number of the plurality of conductors. Therefore, the resin film 20 can be disposed on the upper and lower sides the plurality of conductors 10 so as to cover all of the plurality of conductors 10, and the resin films 20 are prevented from covering the upper and lower sides with an excessive length. Accordingly, it is possible to reduce the possibility that the length of the resin films 20 are insufficient and, for example, the conductor 10*b* on both end sides causes the conductor parallel collapse, or that the resin films 20 are too long and the gaps S in which the insulators 30 are not present are generated on both end sides of the plurality of conductors 10 and the conductor parallel collapse occurs due to the presence of the gaps S.

Further, according to the method for manufacturing the flat electric wire 1 of the present embodiment, the insulator 30 is formed by disposing the insulating heat shrinkable tube T around the plurality of conductors 10 on which the resins films 20 are disposed and thermally shrinking the plurality of conductors 10, or by extrusion coating the insulating resin softened by heating. Therefore, a part of the resin film 20 is melted by heating when the heat shrinkable tube T is thermally shrunk, or by heat of the insulating resin softened by the heating, and enters the gap (for example, the region A) between the plurality of conductors 10. Accordingly, it is possible to increase the effect of holding the plurality of conductors 10 by increasing an adhesion force between the resin film 20 and the plurality of conductors 10 and suppressing the conductor parallel collapse.

The present disclosure has been described based on the embodiment, but the present disclosure is not limited to the embodiment described above. The present disclosure may be appropriately modified without departing from the spirit of the present disclosure, and may be appropriately combined with well-known and known techniques if possible.

For example, in the present embodiment, a configuration is assumed in which the resin films 20 are configured to be long similar to the plurality of conductors 10, and one long resin film 20 is provided on each of the upper and lower sides of the plurality of conductors 10 in the thickness direction. However, the present disclosure is not limited thereto, and for example, the resin films 20 may be formed to be slightly short, and a plurality of short resin films 20 may be laid along the longitudinal direction of the plurality of conductors 10 so as to be stacked over the entire region of the plurality of conductors 10 in the longitudinal direction. In this way, by using the short resin films 20, it is possible to easily prevent a situation such as excessive pulling and breakage of the resin film 20 on an outer side of the bend and breakage during flatwise bending.

In addition, when the plurality of short resin films 20 are laid in the longitudinal direction, an interval may be provided between the resin films 20. That is, the short resin films 20 may be provided intermittently along the longitudinal direction. This is because, even if the resin films 20 are provided intermittently, the conductor parallel collapse can be suppressed at positions where the resin films 20 are provided. In particular, in a case where a position to be edgewise bent is known in advance, the resin films 20 may be provided in a spot form at the position.

A metal foil may be provided on the surface of the resin film 20 on the conductor side. In particular, the adhesive or the pressure-sensitive adhesive may be provided on the metal foil.

Here, features of the embodiment of the flat electric wire and the method for manufacturing the flat electric wire according to the present disclosure described above will be briefly summarized and listed in the following first to fourth aspects.

According to a first aspect of the present disclosure, a flat electric wire (1) includes a plurality of conductors (10) arranged in parallel in a width direction and having substantially a same cross-sectional area with each other, resin films (20) provided on one side and the other side of the plurality of conductors (10) in a thickness direction orthogonal to the width direction, and an insulator (30) covering the plurality of conductors (10) together with the resin films (20). Each of the resin films (20) have a Young's modulus of 2 GPa or more and a film thickness of 200 μm or more.

According to a second aspect of the present disclosure, the each of the resin films (20) have the Young's modulus of 5 GPa or less and the film thickness of 300 μm or less.

According to a third aspect of the present disclosure, a length of the each of the resin films (20) in the width direction is within a range of a minimum length to a maximum length. The minimum length is calculated by multiplying an outer diameter of one conductor (10) by one less than the number of the plurality of conductors (10). The maximum length is calculated by multiplying the outer diameter of one conductor (10) by the number of the plurality of conductors (10).

According to a fourth aspect of the present disclosure, a flat electric wire (1) includes a plurality of conductors (10) arranged in parallel in a width direction and having substantially a same cross-sectional area to each other, and an insulator (30) covering the plurality of conductors (10). A method for manufacturing the flat electric wire (1) includes arranging resin films (20) on one side and the other side of the plurality of conductors (10) in a thickness direction orthogonal to the width direction, and forming the insulator (30) by thermally shrinking an insulating heat shrinkable tube (T) disposed around the plurality of conductors (10) on which the resin films (20) are arranged, or by extrusion coating an insulating resin softened by heating. The resin films (20) each having a Young's modulus of 2 GPa or more and a film thickness of 200 μm or more.

What is claimed is:

1. A flat electric wire comprising:

a plurality of conductors arranged in parallel in a width direction and having substantially a same cross-sectional area with each other;

resin films provided on one side and the other side of the plurality of conductors in a thickness direction orthogonal to the width direction; and an insulator covering the plurality of conductors together with the resin films, wherein each of the resin films have a Young's modulus of 2 GPa or more and a film thickness of 200 μm or more.

2. The flat electric wire according to claim 1, wherein the each of the resin films have the Young's modulus of 5 GPa or less and the film thickness of 300 μm or less.

3. The flat electric wire according to claim 1, wherein a length of the each of the resin films in the width direction is within a range of a minimum length to a maximum length, wherein the minimum length is calculated by multiplying an outer diameter of one conductor by one less than the number of the plurality of conductors, and wherein the maximum length is calculated by multiplying the outer diameter of one conductor by the number of the plurality of conductors.

4. The flat electric wire according to claim 1, wherein a region surrounded by the adjacent conductors and the resin film is not filled with the insulator and is a gap.

5. A method for manufacturing a flat electric wire including a plurality of conductors arranged in parallel in a width direction and having substantially a same cross-sectional area to each other, and an insulator covering the plurality of conductors, the method comprising:

arranging resin films on one side and the other side of the plurality of conductors in a thickness direction orthogonal to the width direction, the resin films each having a Young's modulus of 2 GPa or more and a film thickness of 200 μm or more; and forming the insulator by thermally shrinking an insulating heat shrinkable tube disposed around the plurality of conductors on which the resin films are arranged, or by extrusion coating an insulating resin softened by heating.

* * * * *